United States Patent
Steinhauser et al.

(10) Patent No.: US 7,008,006 B2
(45) Date of Patent: Mar. 7, 2006

(54) PASSENGER VEHICLE STRUCTURE AND METHOD OF MAKING SAME

(75) Inventors: Dieter Steinhauser, Remshalden (DE); Thomas Meier, Rheinstetten (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 147 days.

(21) Appl. No.: 10/608,447

(22) Filed: Jun. 30, 2003

(65) Prior Publication Data

US 2004/0070229 A1 Apr. 15, 2004

(30) Foreign Application Priority Data

Jun. 29, 2002 (DE) .................................. 102 29 400

(51) Int. Cl.
    *B62D 29/04* (2006.01)

(52) U.S. Cl. .................. 296/181.2; 296/187.09; 296/203.02; 296/205

(58) Field of Classification Search ............. 296/181.2, 296/187.09, 193.05, 203.02, 205, 187.12, 296/193.01, 193.04, 193.09
See application file for complete search history.

(56) References Cited

U.S. PATENT DOCUMENTS

| | | | |
|---|---|---|---|
| 3,145,000 A | | 8/1964 | Mackie |
| 3,550,948 A | | 12/1970 | Thompson, Jr. |
| 4,382,626 A | * | 5/1983 | Spooner .................. 296/181.2 |
| 4,453,763 A | * | 6/1984 | Richards .................. 296/181.2 |
| 4,491,362 A | * | 1/1985 | Kennedy .................. 296/181.2 |
| 4,863,771 A | * | 9/1989 | Freeman .................... 428/36.1 |
| 5,009,463 A | * | 4/1991 | Saitoh et al. ............... 296/210 |
| 5,076,632 A | * | 12/1991 | Surratt .................... 296/96.21 |
| 5,358,300 A | * | 10/1994 | Gray .......................... 296/192 |
| 5,853,857 A | | 12/1998 | Mahmood et al. |
| 5,914,163 A | * | 6/1999 | Browne ..................... 428/36.1 |
| 5,934,745 A | * | 8/1999 | Moore et al. .......... 296/193.04 |
| 6,168,226 B1 | * | 1/2001 | Wycech .................... 296/146.6 |
| 6,183,034 B1 | * | 2/2001 | Moody et al. ........... 296/96.21 |
| 6,299,246 B1 | * | 10/2001 | Tomka ....................... 264/250 |

FOREIGN PATENT DOCUMENTS

| | | |
|---|---|---|
| DE | 176895 | 1/1942 |
| EP | 0 286 058 | 10/1988 |
| EP | 1 068 190 B1 | 1/2002 |

OTHER PUBLICATIONS

European Search Report mailed Feb. 20, 2004.

* cited by examiner

*Primary Examiner*—D. Glen Dayoan
*Assistant Examiner*—Greg Blankenship
(74) *Attorney, Agent, or Firm*—Crowell & Moring LLP

(57) ABSTRACT

A structure is provided which is suitable for a passenger vehicle, containing a passenger cell with a windshield frame. For optimization of this structure with regard to advantageous manufacture and purposeful stability, panel structure and windshield frame consist of high-strength non-metallic material, e.g. fiber reinforced plastic, and are structurally joined.

21 Claims, 4 Drawing Sheets

PASSENGER VEHICLE STRUCTURE AND METHOD OF MAKING SAME

BACKGROUND AND SUMMARY OF THE INVENTION

This application claims the priority of German Application No. 102 29 400.3, filed Jun. 29, 2002, the disclosure of which is expressly incorporated by reference herein.

A commonly owned application Ser. No. 10/608,444, filed Jun. 29, 2003, based on German application of German Application No. 102 29 401.1 filed on Jun. 29, 2002, describes related subject matter and the same is incorporated herein by reference thereto to the extent that the disclosure aids in understanding the present invention.

The present invention concerns the structure for a vehicle, specifically a passenger vehicle containing a passenger cell with a windshield frame, which is attached to a panel structure of the passenger cell.

A prior structure described in U.S. Pat. No. 5,076,632 has been designed for a passenger vehicle with an open body without fixed members between a windshield frame and rear structure. The windshield frame consists of a surrounding tubular metal member covered with foam material and an enveloping surface.

European Patent Document No. EP 0 286 058 A2 deals with a self-supporting structural element of composite material for a vehicle structure, that is formed by a panel piece. This panel piece has a transition piece bordered by surface layers. This structural element produces a good strength-to-weight ratio.

U.S. Pat. No. 3,145,000 discloses a high-strength, glass-fiber reinforced component for an aircraft wing, where the wing is provided with a panel section that contains a core e.g. honeycomb structure embedded in deck panels.

It is a purpose of the invention to design a structure for a vehicle, specifically a passenger vehicle, including a passenger cell with a high-strength windshield frame that can easily be integrated in the structure.

The present invention meets said purpose by providing a structure for a passenger vehicle, containing a passenger cell with a windshield frame, which is attached to a panel structure of the passenger cell. Additional advantageous invention feature details are described herein and in the claims.

The invention offers major advantages in that the panel structure and the windshield frame consist of basically the same high-strength non-metallic material—fiber reinforced plastic, carbon fiber reinforced plastic (CFRP). Besides resulting in an identical-material design of different structural components, it also facilitates a particularly stable windshield frame. Furthermore, the choice of this material allows optimization of manufacturing processes. On the side of the panel structure, the windshield frame is provided with flanges held in position by adhesive bonding to a first and a second panel section of the panel structure, which contributes to a functional connection of said structural components.

Support columns are provided inside the hollow spaces of the upright columns of the windshield frame, which, combined with the columns of the windshield frame, increase passenger safety during multiple rollovers of the passenger vehicle, in that the support columns will be effective in addition to the windshield frame columns. The metal support columns are connected with retainer plates attached thereto and supported by the panel structure. The retainer plates are bolted to said panel structure.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
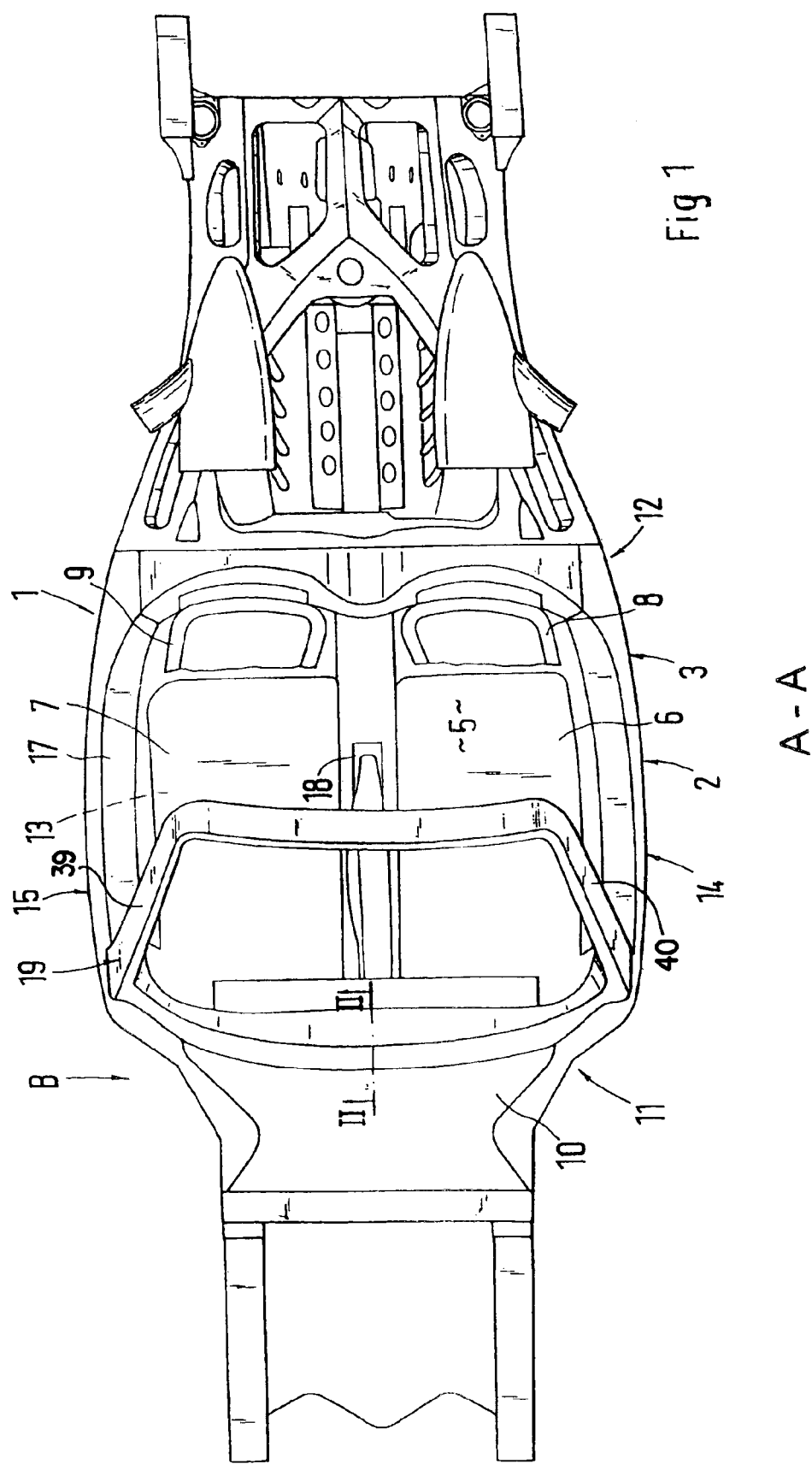
FIG. 1 is a schematic view from above, of a passenger vehicle with a structure according to the invention.

In the drawing FIG. 1, unnumbered structure shown to the right to the right of the reference character 12 is depicted only to show an exemplary environment of the present invention and is therefore not further described herein.

Of a passenger vehicle 1 with an open body, essentially only one vehicle body structure 2 is shown, which comprises structure 3. Structure 3 includes a passenger cell 4 with a passenger compartment 5, housings 6 and 7, and two diagrammatically indicated vehicle seats 8 and 9. The passenger cell 4 consists of high-strength non-metallic material such as carbon fiber-reinforced plastic composite (CFRP) and has a panel body 10 with a front panel structure 11 and a rear panel structure 12, joined to a floor structure 13. The floor structure 13 is bordered on the longitudinal sides 14, 15 by cross-sectional box-shaped frame side members 16,17 that extend between the panel structures 11 and 12, and contains a center tunnel 18 that runs between the front panel structure 11 and the rear panel structure 12; the frame side members 16,17 and the center tunnel 18 extend in longitudinal vehicle direction A—A.

Figure 2:
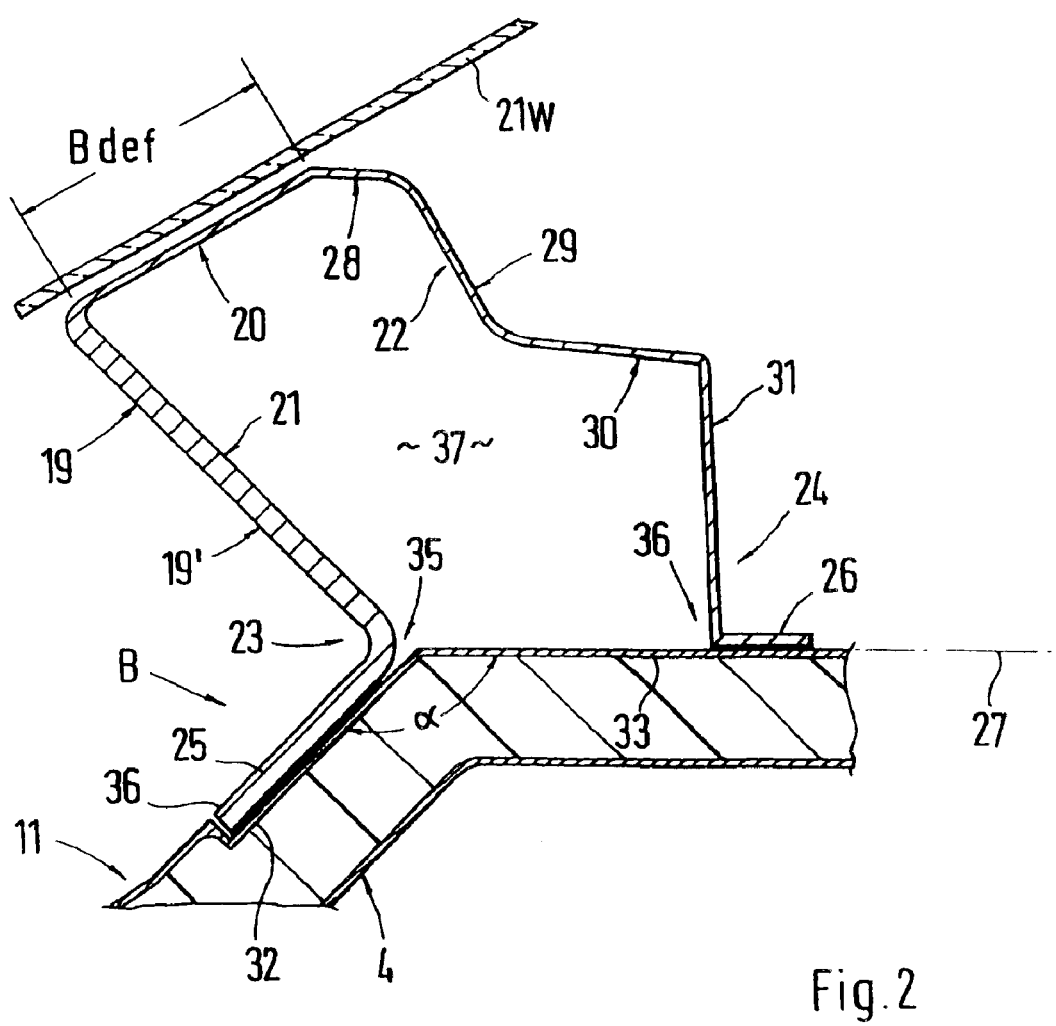
FIG. 2 is a large-scale cross sectional view along line II—II of FIG. 1.

According to FIG. 2, the front panel structure 11 and a non-metallic windshield frame 19 are structurally joined; the windshield frame 19 also consisting of high-strength fiber-reinforced plastic (CFRP) just like the remaining structure 3 or passenger cell 4. The windshield frame 19 is designed as a hollow girder 19' (FIG. 2), which, on a side B facing the passenger cell 4 encloses a bearing panel 20 in a defined width Bdef for a windshield 21W. This bearing panel 20 is provided with support panels 21, 22, its free ends 23, 24 being provided with flanges 25, 26. Between bearing panel 20 and windshield 21W one or more adhesive seals are provided. The support panel 21 forms an obtuse or a right angle with the bearing panel 20; there is a similar angle between flange 25 and support panel 21, and the flange 25 forms an obtuse angle α with a horizontal line 27. With its relatively short, horizontal piece 28, the second support panel 22 leads away from the bearing panel 20 and joins a piece 29 that extends to the bearing wall 20 in a right or obtuse angle and becomes a horizontal piece 30. This piece continues as a perpendicular piece 31, and transitions into the horizontal flange 26. The flanges 25, 26 lead to a first panel section 32 and a second panel section 33 of the panel structure 11 and are there held in position by means of bonding 34, 35. For alignment of the flange 25, the first panel section 32 is provided with an opening 36. Furthermore, the hollow space 37 of the hollow girder 19' may be filled with suitable material, preferably foam material, which, among other things, serves to reinforce the hollow girder 19'.

Figure 3:
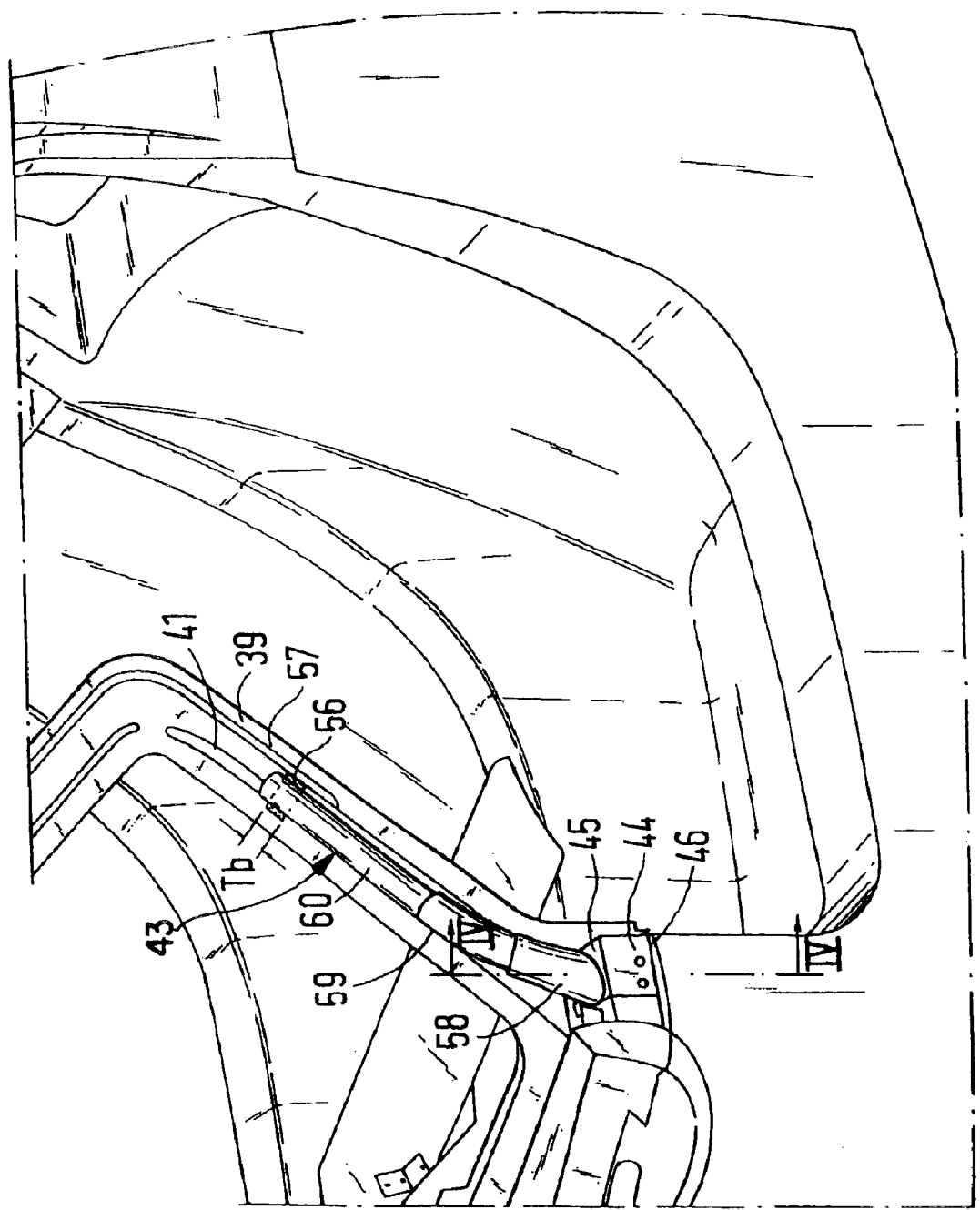
FIG. 3 is a perspective angular view of a windshield frame column of the structure of FIGS. 1 and 2.
Figure 4:
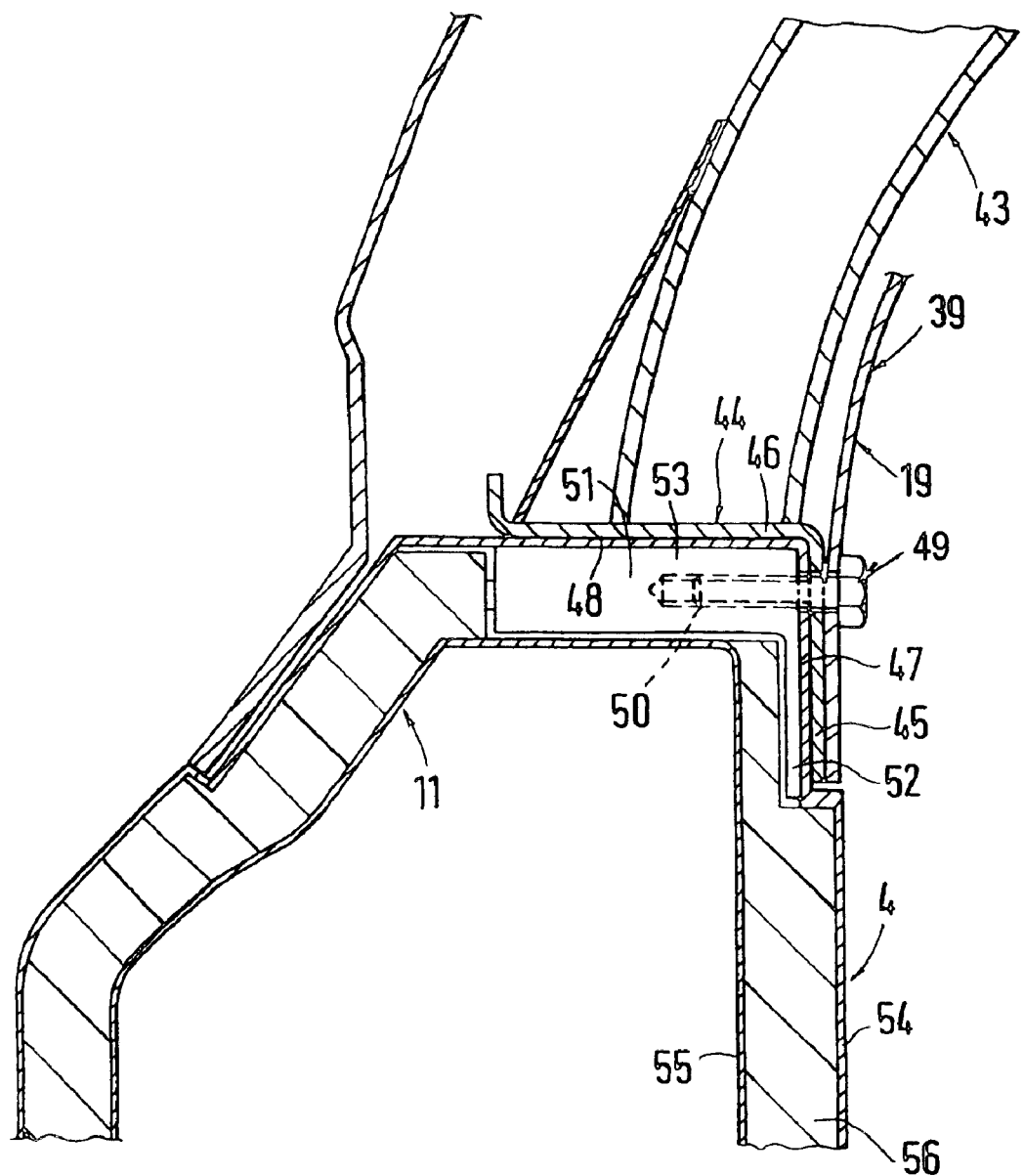
FIG. 4 is a large-scale cross section approximately along line IV—IV of FIG. 3.

The windshield frame 19 shows upright columns 39, 40, so-called A-pillars, (FIG. 1), that are provided with hollow spaces 41,42 containing support columns 43 (FIG. 3). Each support column 43 consists of metal—high-strength steel or aluminum alloy—and is attached to the front panel structure 11. The support column 43 is held in position on said panel structure by means of a retaining plate 44, which retaining plate 44 has legs 45, 46 that extend toward each other at an angle (FIG. 4). The legs 45, 46 abut the corresponding panel areas 47, 48 of the front panel structure 11. The retaining plate 44 is attached with bolts 49, which align with the tap holes 50 of a metallic insert 51. The insert 51 with angular legs 52, 53 is integrated in the front panel structure 11 in such manner that this insert is surrounded by border panels 54, 55 of the panel structure 11 which enclose a core 56 outside the insert 51. A corresponding design can be found in EP 0 286 058 A2. Between the support column 43 and the column 39, foamed material 56 will limit possible relative motion (FIG. 3). This foamed material extends across a relatively small section Tb of the entire length of the support column 43 and adjacent on one free end 57 of said column. Also, the support column 43 consists of three sleeved tubes 58, 59, 60, which in this design show a circular cross section and are retained by a press fit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Structure for a passenger vehicle, containing a passenger cell with a windshield frame which is attached to a panel structure of the passenger cell, with a distinguishing feature that the panel structure of the passenger cell and the windshield frame comprises of high-strength non-metallic material and are structurally joined to one another,
    wherein on a side facing the panel structure, the windshield frame is provided with flanges which are held in position on a first panel section and a second panel section of the panel structure by means of adhesive bonding.

2. Structure according to claim 1, wherein the panel structure is a front panel structure, and
    wherein hollow spaces of columns of the windshield frame contain additional supporting columns, made of high-strength metal, that are attached to the front panel structure.

3. Structure according to claim 2, wherein each supporting column is held on the front panel structure by means of a retaining plate.

4. Structure according to claim 3, wherein the retaining plate has legs that extend toward each other at an angle and rest on corresponding panel sections of the front panel structure.

5. Structure according to claim 3, wherein the retaining plate is held in position with bolts, which align with tap holes of an insert, integrated in the front panel structure.

6. Structure according to claim 5, wherein the insert is a metallic insert.

7. Structure according to claim 2, wherein the support columns are attached to columns of the windshield frame only in an area of free ends of the support columns by means of a foam material body.

8. Structure according to claim 3, wherein the support columns are attached to columns of the windshield frame only in an area of free ends of the support columns by means of a foam material body.

9. Structure according to claim 4, wherein the support columns are attached to columns of the windshield frame only in an area of free ends of the support columns by means of a foam material body.

10. Structure according to claim 5, wherein the support columns are attached to columns of the windshield frame only in an area of free ends of the support columns by means of a foam material body.

11. Structure according to claim 2, wherein each support column includes a minimum of two tubes that fit into each other.

12. Structure according to claim 3, wherein each support column includes a minimum of two tubes that fit into each other.

13. Structure according to claim 4, wherein each support column includes a minimum of two tubes that fit into each other.

14. Structure according to claim 5, wherein each support column includes a minimum of two tubes that fit into each other.

15. Structure according to claim 7, wherein each support column includes a minimum of two tubes that fit into each other.

16. A structure according to claim 1, wherein the high-strength non-metallic material is fiber-reinforced plastic.

17. A structure according to claim 1, wherein the high-strength non-metallic material is carbon fiber-reinforced plastic.

18. A passenger vehicle assembly comprising:
    a passenger cell comprising panel structure, and
    a windshield frame attached to the passenger cell, said windshield frame including a hollow girder,
    wherein both the hollow girder and the panel structure to which it is attached consist of high-strength nonmetallic material,
    wherein the hollow girder and the panel structure are adhesively connected at flanges provided on the hollow girder,
    wherein the panel structure is a front panel structure, and
    wherein hollow spaces of columns of the windshield frame contain additional supporting columns, made of high-strength metal, that are attached to the front panel structure.

19. A method of making a passenger vehicle assembly comprising:
    a passenger cell comprising panel structure, and
    a windshield frame attached to the passenger cell, said windshield frame including a hollow girder,
    wherein both the hollow girder and the panel structure to which it is attached consist of high-strength nonmetallic material,
    said method comprising adhesive bonding of the hollow girder with the panel structures along flanges of the hollow girder
    wherein the panel structure is a front panel structure, and
    wherein hollow spaces of columns of the windshield frame contain additional supporting columns, made of high-strength metal, that are attached to the front panel structure.

20. A passenger vehicle assembly comprising:
    a passenger cell comprising a front panel structure, and a windshield frame attached to the passenger cell front panel structure, wherein both the windshield frame and the panel structure to which it is attached consist of high-strength nonmetallic material, wherein said non-metallic material is carbon fiber reinforced plastic, wherein said windshield frame and panel structure are attached by adhesive bonding, and wherein hollow spaces of columns of the windshield frame contain additional supporting columns, made of high-strength metal, that are attached to the front panel structure.

21. A method of making a passenger vehicle assembly comprising:

a passenger cell comprising panel structure, and a windshield frame attached to the passenger cell panel structure, wherein both the windshield frame and the panel structure to which it is attached consist of high-strength nonmetallic material, wherein said non-metallic material is carbon fiber reinforced plastic, and wherein hollow spaces of columns of the windshield frame contain additional supporting columns, made of high-strength metal, that are attached to the front panel structure, said method comprising adhesive bonding of the windshield frame with the panel structure.

* * * * *